(12) United States Patent
Geddes et al.

(10) Patent No.: US 12,061,832 B2
(45) Date of Patent: Aug. 13, 2024

(54) VIRTUAL DISPLAY INSTANTIATION FOR VIDEO CONFERENCE CONTENT SCREEN SHARING

(71) Applicant: Zoom Video Communications, Inc., San Jose, CA (US)

(72) Inventors: Graeme Lambourne Geddes, Aliso Viejo, CA (US); Shawn Michael Rolin, San Jose, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 126 days.

(21) Appl. No.: 17/729,506

(22) Filed: Apr. 26, 2022

(65) Prior Publication Data

US 2023/0342101 A1  Oct. 26, 2023

(51) Int. Cl.
*G06F 3/14* (2006.01)
*H04N 7/15* (2006.01)

(52) U.S. Cl.
CPC ........... *G06F 3/1454* (2013.01); *H04N 7/155* (2013.01)

(58) Field of Classification Search
CPC ........ G06F 3/1454; G06F 3/0482; G06F 3/14; H04N 7/155; H04N 7/142; H04N 7/147; H04N 7/15; H04M 3/563
USPC ............ 348/14.07, 14.08, 14.1, 14.01, 14.02
See application file for complete search history.

(56) References Cited

U.S. PATENT DOCUMENTS

| | | | |
|---|---|---|---|
| 9,621,853 B1 | 4/2017 | Yang et al. | |
| 10,075,492 B2 | 9/2018 | Kawakubo | |
| 10,735,481 B2 | 8/2020 | Mota et al. | |
| 11,190,731 B1 * | 11/2021 | Sculley | H04N 7/15 |
| 2014/0313278 A1 | 10/2014 | Periyannan et al. | |
| 2017/0208212 A1 | 7/2017 | Tsukamoto | |
| 2018/0074779 A1 | 3/2018 | Marquardt et al. | |
| 2021/0385262 A1 | 12/2021 | Kumata et al. | |

FOREIGN PATENT DOCUMENTS

| | | |
|---|---|---|
| WO | 2019104085 A1 | 5/2019 |
| WO | 2021148682 A1 | 7/2021 |

OTHER PUBLICATIONS

International Search Report and Written Opinion mailed on Jul. 21, 2023 in corresponding PCT Application No. PCT/US2023/019606.
(Continued)

*Primary Examiner* — Yosef K Laekemariam
(74) *Attorney, Agent, or Firm* — Young Basile Hanlon & MacFarlane, P.C.

(57) ABSTRACT

Cloud-connected wireless screen extension is performed to facilitate a screen share of content using a virtual display instantiated based on a connection between a first device and a second device. A virtual display is instantiated at a first device associated with a conference participant of a video conference based on a connection established between the first device and a second device. A screen share of first content during the video conference is then facilitated from the first device via the second device using the virtual display while second content excluded from the screen share is output at a display of the first device. In this way, the second device can be adapted as an additional (e.g., extended) display available for screen sharing content from the first device during a video conference.

20 Claims, 8 Drawing Sheets

(56) References Cited

OTHER PUBLICATIONS

Anonymous: "Microsoft Teams Meetings Quick Start Guide", Mar. 11, 2021 (Mar. 11, 2021), XP055980918, Retrieved from the Internet: URL: https://www.microsoft.com/cms/api/am/binary/RWyUxX [retrieved on Nov. 14, 2022] pp. 16-17.

* cited by examiner

VIRTUAL DISPLAY INSTANTIATION FOR VIDEO CONFERENCE CONTENT SCREEN SHARING

FIELD

This disclosure generally relates to cloud-connected wireless screen extension, and, more specifically, to facilitating a screen share of content from a first device during a video conference via a second device using a virtual display instantiated based on a connection between the first device and the second device.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
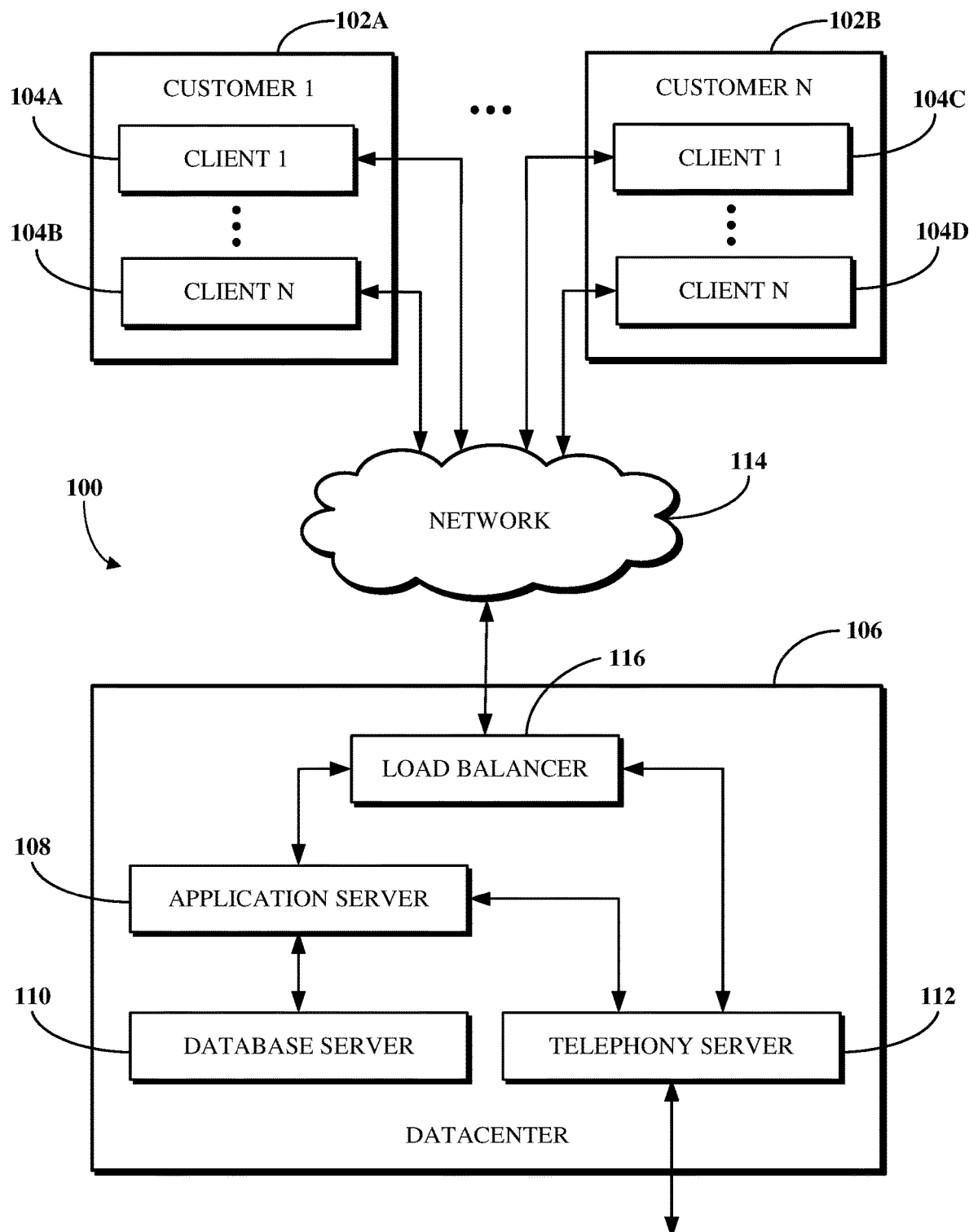
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

Conventional conferencing software approaches allow a conference participant to use screen share functionality to share media from their computing device to a user interface of conferencing software. Such conventional approaches are generally limited to allowing a conference participant to mirror a display of their computing device, thereby identically reproducing the media that is actually output at that display. In some cases, this is sufficient as the conference participant may only need a single set of materials visually presented by the screen share to conduct their presentation to the other conference participants. However, in other cases, the conference participant may need to access supporting materials (e.g., notes) at their computing device to deliver the presentation. Because the screen share is mirroring the computing device display, where their computing device has only a single display, this ultimately either means that the presenting conference participant must also share their supporting materials within the screen share, which may be undesirable for any number of reasons, or must conduct the presentation without those supporting materials, which could negatively affect the quality of the presentation. Where the presenting conference participant is in a physical space with other computing devices (e.g., a conference room device which includes a display, a digital whiteboard device, or a digital signage device), it would be desirable to leverage a display of such another device as a secondary display device for the conference participant to effectively use as a second display with their own computing device. However, technical limitations of conventional conferencing software approaches do not support such secondary display device capability.

Implementations of this disclosure address problems such as these by facilitating a screen share of content from a first device during a video conference via a second device using a virtual display instantiated based on a connection between the first device and the second device. A first device associated with a conference participant can connect with (e.g., via ultrasonic pairing) a second device within a same physical space before or during a video conference. The pairing triggers a client application running at the first device to instantiate a virtual display using a virtual display driver that instructs an operating system of the first device to recognize a display of the second device as an available (e.g., extended) display of the first device. The conference participant can then prepare and cause the content to be screen shared using the virtual display. This, for example, enables the conference participant to maintain use of the display of first device for supporting materials while presenting mirrored screen share media from the virtual display via the second device. Thus, a screen share of first content during the video conference may be facilitated from the first device via the second device using the virtual display, such as while second content excluded from the screen share is output at a display of the first device.

To describe some implementations in greater detail, reference is first made to examples of hardware and software structures used to implement a system for facilitating a screen share of content using a virtual display instantiated based on a connection between a first device and a second device. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
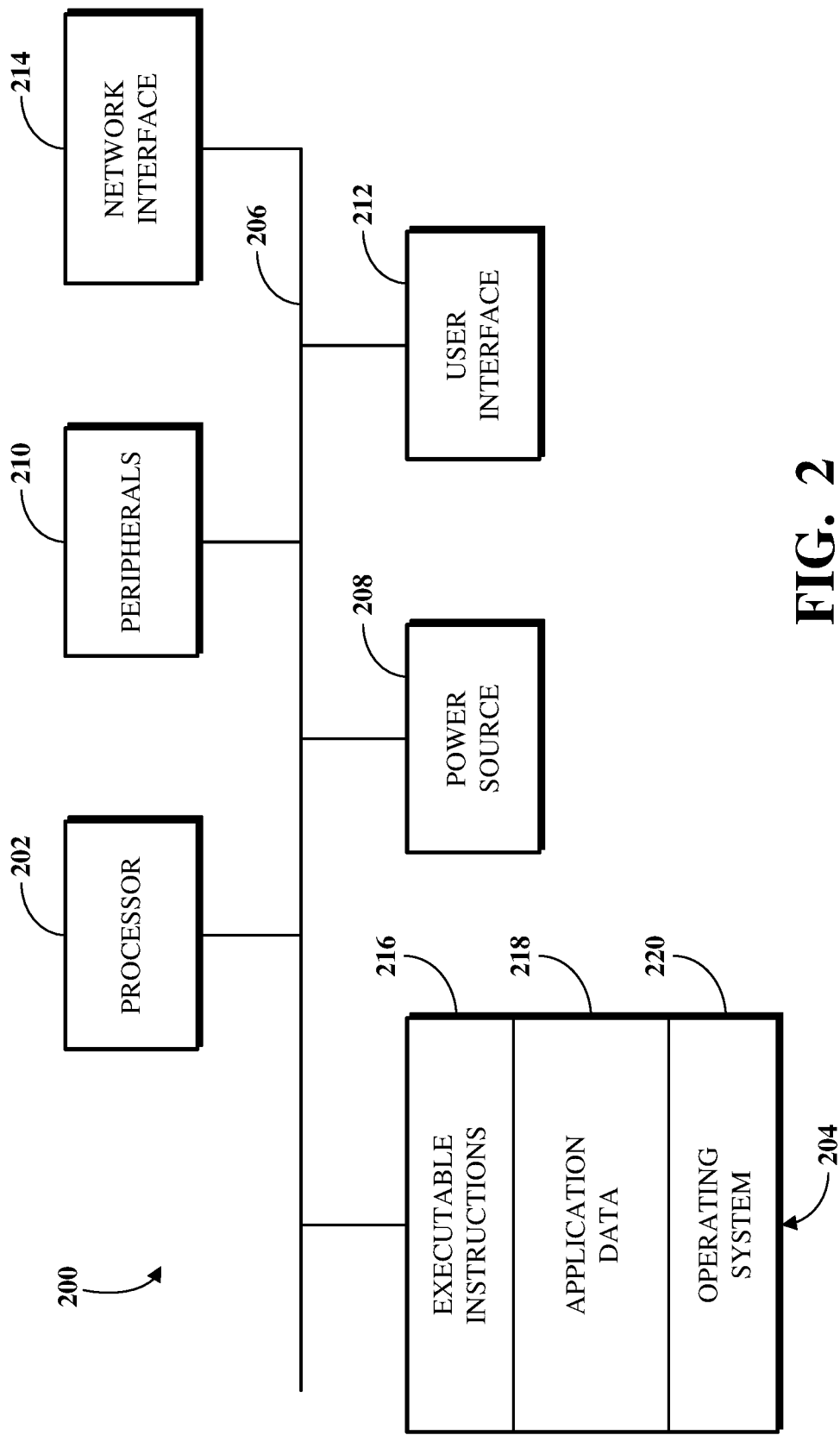
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
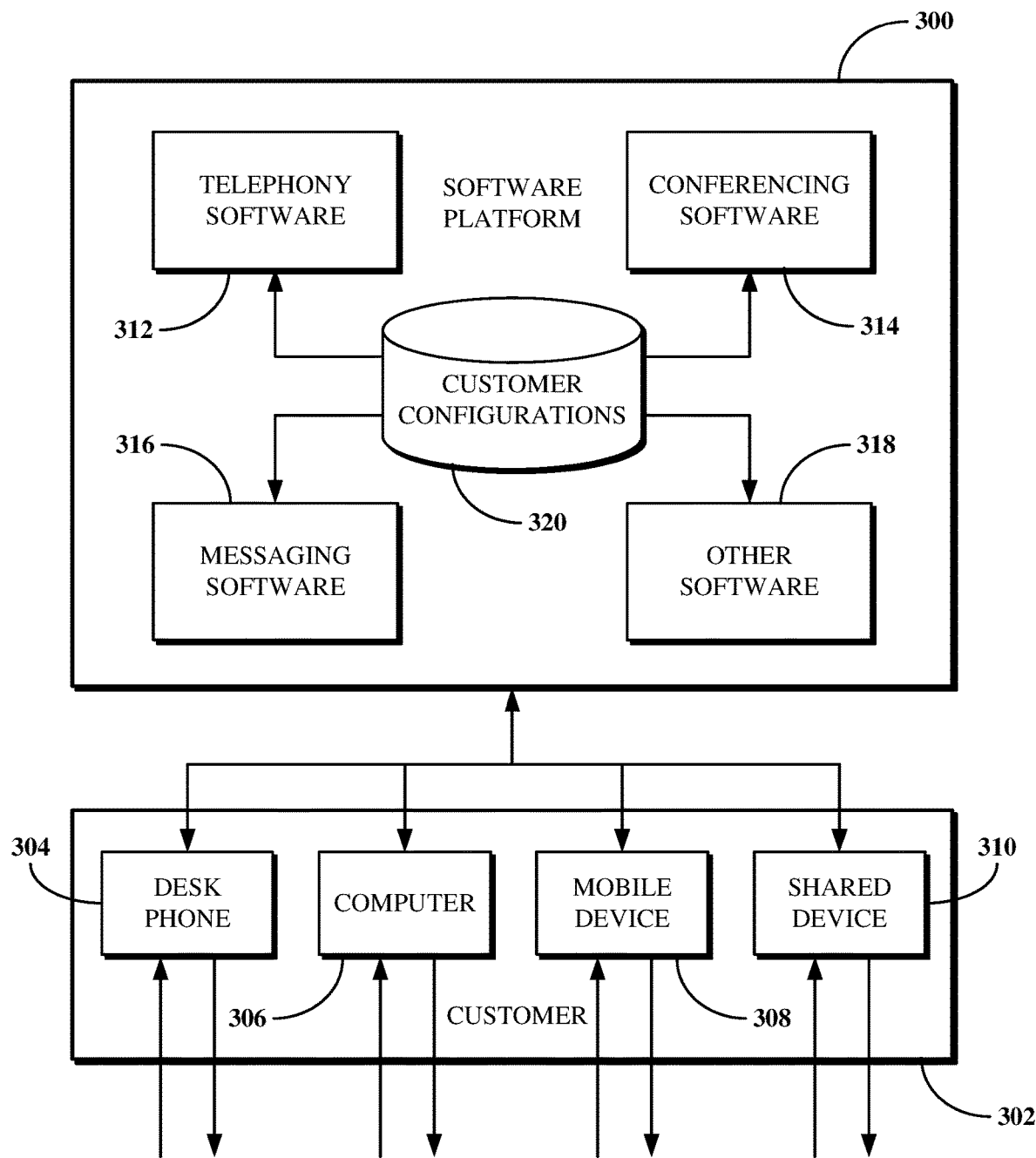
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for facilitating a screen share of content using a virtual display instantiated based on a connection between a first device and a second device. In some such cases, the other software 318 may be or be included in the conferencing software 314.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
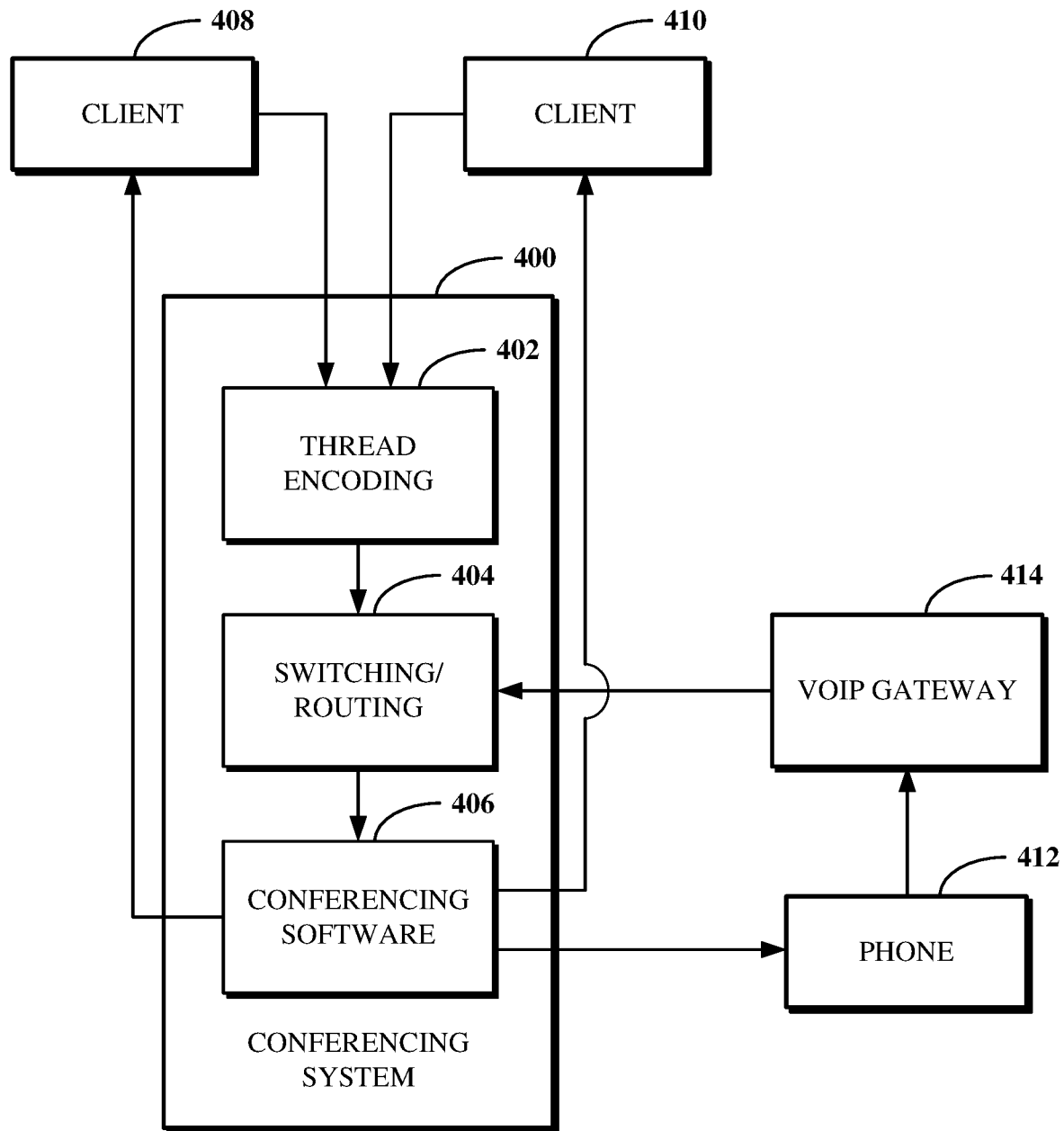
FIG. 4 is a block diagram of an example of a conferencing system for delivering conferencing software services in an electronic computing and communications system.

FIG. 4 is a block diagram of an example of a conferencing system 400 for delivering conferencing software services in an electronic computing and communications system, for example, the system 100 shown in FIG. 1. The conferencing system 400 includes a thread encoding tool 402, a switching/routing tool 404, and conferencing software 406. The conferencing software 406, which may, for example, be the conferencing software 314 shown in FIG. 3, is software for implementing conferences (e.g., video conferences) between users of clients and/or phones, such as clients 408 and 410 and phone 412. For example, the clients 408 or 410 may each be one of the clients 304 through 310 shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other numbers of clients and/or other numbers of phones can connect to the conferencing system 400.

Implementing a conference includes transmitting and receiving video, audio, and/or other data between clients and/or phones, as applicable, of the conference participants. Each of the client 408, the client 410, and the phone 412 may connect through the conferencing system 400 using separate input streams to enable users thereof to participate in a conference together using the conferencing software 406. The various channels used for establishing connections between the clients 408 and 410 and the phone 412 may, for example, be based on the individual device capabilities of the clients 408 and 410 and the phone 412.

The conferencing software 406 includes a user interface tile for each input stream received and processed at the conferencing system 400. A user interface tile as used herein generally refers to a portion of a conferencing software user interface which displays information (e.g., a rendered video) associated with one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the conferencing software user interface while the user interface tiles for other conference participants are reduced in size and arranged near an edge of the conferencing software user interface.

The content of the user interface tile associated with a given participant may be dependent upon the source of the input stream for that participant. For example, where a participant accesses the conferencing software 406 from a client, such as the client 408 or 410, the user interface tile associated with that participant may include a video stream captured at the client and transmitted to the conferencing system 400, which is then transmitted from the conferencing system 400 to other clients for viewing by other participants (although the participant may optionally disable video features to suspend the video stream from being presented during some or all of the conference). In another example, where a participant access the conferencing software 406 from a phone, such as the phone 412, the user interface tile for the participant may be limited to a static image showing text (e.g., a name, telephone number, or other identifier associated with the participant or the phone 412) or other default background aspect since there is no video stream presented for that participant.

The thread encoding tool 402 receives video streams separately from the clients 408 and 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 direct the encoded streams through applicable network infrastructure and/or other hardware to deliver the encoded streams to the conferencing software 406. The conferencing software 406 transmits the encoded video streams to each connected client, such as the clients 408 and 410, which receive and decode the encoded video streams to output the video content thereof for display by video output components of the clients, such as within respective user interface tiles of a user interface of the conferencing software 406.

A user of the phone 412 participates in a conference using an audio-only connection and may be referred to an audio-only caller. To participate in the conference from the phone 412, an audio signal from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio signal representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining using clients turns on their video feed for any portion of the conference. In some cases, however, the conference may have video disabled, such as where each participant connects to the conference using a phone rather than a client, or where a host of the conference selectively configures the conference to exclude video functionality.

In some implementations, other software services may be accessible in connection with a conference implemented using the conferencing system 400. For example, a conference may include or otherwise integrate functionality for instant messaging, unified messaging, and other types of messaging communications between participants of the conference, such as to facilitate a chat or like virtual conversation between users of those participants. Those other software services may be implemented at the conferencing system 400 and/or a different aspect of the system 100.

Figure 5:
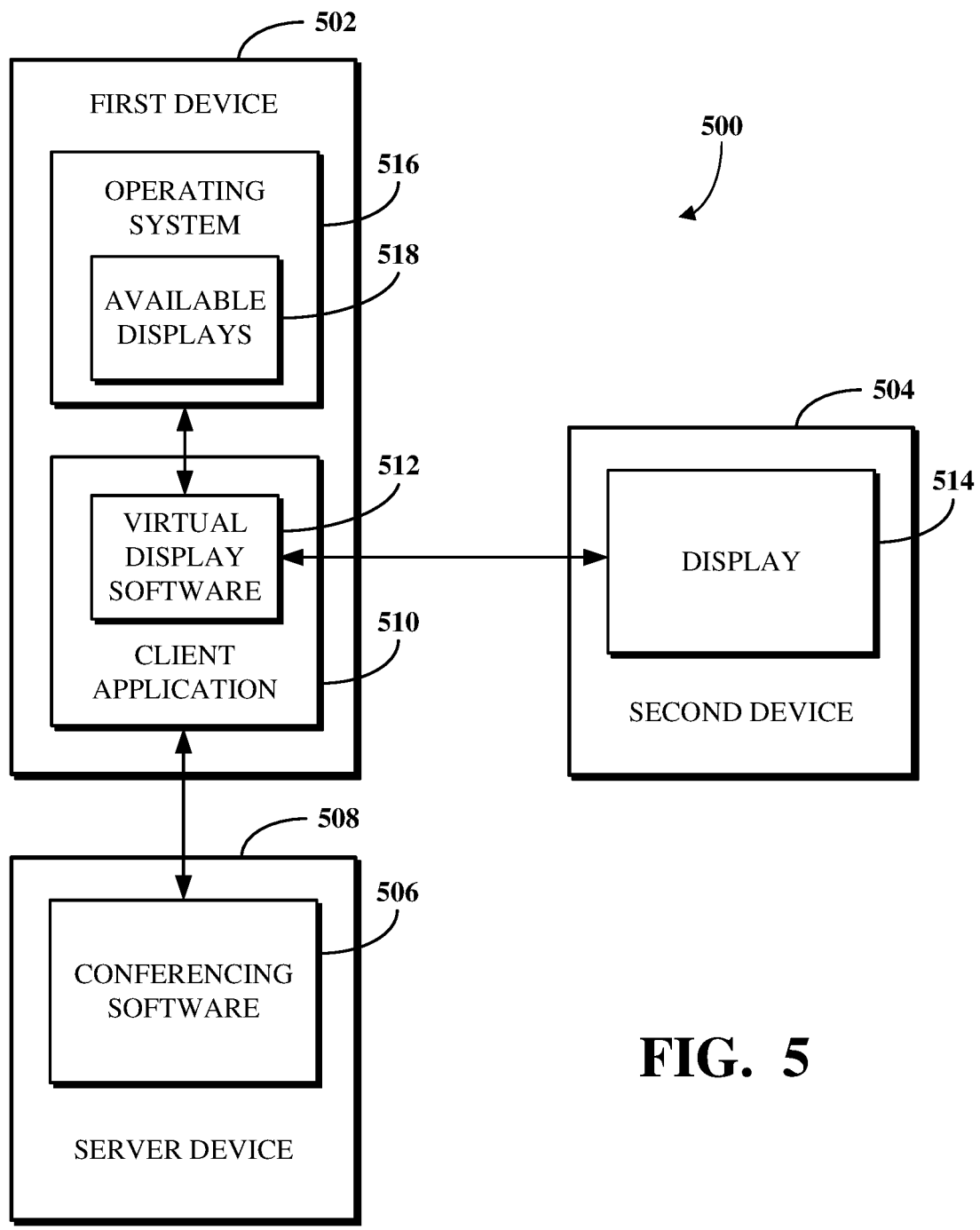
FIG. 5 is a block diagram of an example of a system for facilitating a screen share of content using a virtual display instantiated based on a connection between a first device and a second device.

FIG. 5 is a block diagram of an example of a system 500 for facilitating a screen share of content using a virtual display instantiated based on a connection between a first device 502 and a second device 504. Each of the first device 502 and the second device 504 may, for example, be one of the clients 408 or 410 shown in FIG. 4. The first device 502 is a personal computing device used by a conference participant participating in a video conference implemented by conferencing software 506 at a server device 508. For example, the first device 502 may be a laptop computer, a tablet computer, a desktop computer, or a smartphone. The second device 504 is a personal or shared computing device located in a same physical space (e.g., a conference room, office, classroom, vehicle, or other space) as the first device 502 during at least a portion of the video conference and thus may be used by one or more conference participants participating in the video conference implemented by the conferencing software 506. For example, the second device 504 may be a laptop computer, a tablet computer, a desktop computer, a smartphone, a conference room audio/visual system device, a television, a digital signage device, a digital whiteboard device, a video-enabled smart speaker device, or an in-vehicle (e.g., dashboard or seatback) device. The conferencing software 506 may, for example, be the conferencing software 406 shown in FIG. 4.

The first device connects to the conferencing software 406 using a client application 510. The client application 510 may, for example, be a desktop software application, mobile application, or web application associated with one or more services of a software platform, for example, the software platform 300 shown in FIG. 3. In such a case, the server device 508 may be a computing device used to implement one or more software services of the software platform, for example, services corresponding to one or more of the software 312 through 318 shown in FIG. 3. For example, the client application 510 may be software that allows a user of the first device 502 to access or otherwise use one or more of the software 312 through 318.

The client application 510 includes virtual display software 512 that enables the first device 502 to use a display 514 of the second device 504 to share content from the first device 502 with the video conference. In particular, the virtual display software 512 includes functionality for instantiating a virtual display associated with the display 514 of the second device 504 based on a connection established between the first device 502 and the second device 504, and for facilitating a screen share of first content during the video conference from the first device 502 via the second device 504 using the virtual display while second content excluded from the screen share is output at a display (not shown) of the first device 502. The virtual display software 512 configures the display 514 for as a virtual display of the first device 502 by causing the installation of a virtual device driver for the display 514 at the first device 502. The virtual device driver is software that configures an operating system 516 of the first device 502 to recognize the display 514 as an additional (e.g., extended) display usable for outputting content, and thus to recognize the display 514 as if it were a native display of the first device 502. Although the virtual display software 512 is shown and described as being included in the client application 510, in some implementations, the virtual display software 512 may be separate from the client application 510.

The connection between the first device 502 and the second device 504 may be established by one or more of ultrasonic pairing (e.g., based on an ultrasonic signal transmitted from the second device 504 and received by the first device 502 or vice versa), sharing key, Bluetooth pairing, ultra-wide band communication, Wi-Fi, ZigBee, operating system-specific casting protocols (e.g., Airplay® or Google Cast®), or another local network or protocol. In some cases, a single device may be connected to the second device 504 at a given time. For example, once the first device 502 is connected to the second device 504, the user of the first device 502 may preclude other users from connecting to the second device 504 (e.g., based on a configuration preventing other users from attempting to connect to the second device 504 or by declining requests from other users to connect to the second device 504). In another example, while the first device 502 is connected to the second device 504, a user of another device may connect their device to the second device 504, in which the first device 502 may either continue to share content to the second device 504 while the other device shares content to the second device 504 (e.g., based on a configuration allowing multiple devices to simultaneously connect to the second device 504) or be disconnected from the second device 504 (e.g., based on a configuration allowing a single device to connect to the second device 504).

To cause the installation of the virtual device driver for the display 514, the virtual display software 512 determines the connection between the first device 502 and the second device 504 and based on such connection interprets, invokes, executes, or otherwise runs software configured to cause the operating system 516 to install the virtual display driver. Alternatively, based on the connection between the first device 502 and the second device 504, the virtual display software 512 can transmit the virtual display driver, as instructions or the like from the client application 510 or a storage associated therewith at the first device 502, to the operating system 516 to cause the operating system 516 to install the virtual display driver. The virtual display driver, once installed, updates a configuration of available displays 518 at the first device to add a virtual display bound to the display 514. The virtual display initiated by the virtual display software 512 allows a user of the first device 502 to output content of the first device 502 at the display 514 and to select to share the content from the display 514 to the video conference via screen share. In this way, first content may be output at a display of the first device 502 while second content may be output at the display 514 and shared via screen share through the conferencing software 506 with other participants of the video conference.

In some implementations, the second device 504 may run a client application (not shown) like the client application 510 for connecting the second device 504 to the video conference implemented by the conferencing software 506. For example, the first device 502 and the second device 504 may simultaneously connect to the video conference at the same or substantially the same time. In another example, the first device 502 and the second device 504 may connect to the video conference at different times. In some such implementations, based on the connection between the first device 502 and the second device 504 and the selection at the first device 502 to use a virtual display for sharing content during the video conference via the display 514, the client application 510 and the client application 512 can merge to enable a picture-in-picture, simultaneous output of content from both of a display of the first device 502 and the display 514.

In one example use case, the first device 502 may be a laptop computer and the second device 504 may be a computer connected to a large display (e.g., a television or like-sized monitor) within a conference room. A user of the first device 502 may enter the conference room to participate in a video conference implemented by the conferencing software 506. The first device 502 connects to the video conference using the client application 510. While the first device 502 is connected to the video conference, the second device 504 is not connected to the video conference and may be unused. At some point during the video conference, the user of the first device 502 wishes to initiate a screen share to deliver a presentation with media to other participants of the video conference. The user of the first device 502 may establish a connection between the first device 502 and the second device 504 in order to use the second device 504 as an extended display of the first device 502 for the screen share. For example, the connection may be established by ultrasonic pairing, such as based on an ultrasonic signal transmitted by the second device 502. In another example, the connection may be established by a sharing key accessed at a web address associated with the video conference, the physical space in which the second device 504 is located, or the second device 504 itself. Based on the connection, the client application 510 may cause a virtual display driver to be installed at the first device 502. The installation of the virtual display driver configures a virtual display as an additional (e.g., extended) display for use with the first device 502 and binds the display 514 of the second device 504 to the virtual display. The user of the first device 502 may then initiate a screen share to cause content of the first device 502 to be streamed to participants of the video conference via the virtual display. In some cases, the connection between the first device 502 and the second device 504 may be established when the user of the first device 502 enters the conference room, when the first device 502 connects to the video conference, or at another time prior to the user of the first device 502 wishing to initiate the screen share process.

In another example use case, the first device 502 may be a smartphone and the second device 504 may be an in-vehicle device, such as a seatback monitor in an automobile or airplane in which the user of the first device 502 is a passenger. The user of the first device 502 may, while traveling in the automobile or airplane, be participating in a video conference implemented by the conferencing software 506. During the video conference, the user of the first device 502 is asked by another participant of the video conference to lead a presentation involving a screen share. The user of the first device 502 may establish a connection between the first device 502 and the second device 504 in order to use the second device 504 as an extended display of the first device 502 for the screen share. For example, the connection may be established by Bluetooth pairing. In another example, the connection may be established using a casting protocol such as Airplay® or Google Cast® based on a device type of the second device 504. Based on the connection, the client application 510 may cause a virtual display driver to be installed at the first device 502. The installation of the virtual display driver configures a virtual display as an additional (e.g., extended) display for use with the first device 502 and binds the display 514 of the second device 504 to the virtual display. The user of the first device 502 may then initiate a screen share to cause content of the first device 502 to be streamed to participants of the video conference via the virtual display. In some cases, the connection between the first device 502 and the second device 504 may be established when the user of the first device 502 enters the vehicle, when the first device 502 connects to the video conference, or at another time prior to the user of the first device 502 wishing to initiate the screen share process.

Figure 6:
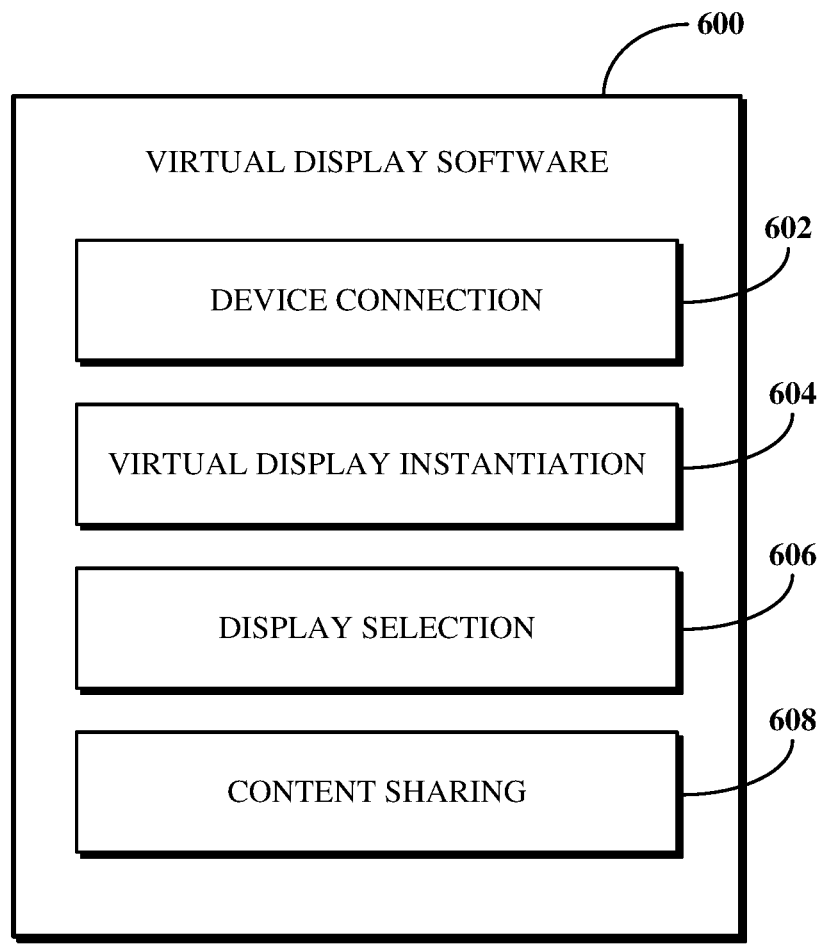
FIG. 6 is a block diagram of an example of functionality of virtual display software.

FIG. 6 is a block diagram of an example of functionality of virtual display software 600, which may, for example, be the virtual display software 512 shown in FIG. 5. The virtual display software 600 includes tools, such as programs, subprograms, functions, routines, subroutines, operations, and/or the like for facilitating a screen share of content from a first device to a video conference via a second device using a virtual display instantiated based on a connection between the first device and the second device. As shown, the virtual display software 600 includes a device connection tool 602, a virtual display instantiation tool 604, a display selection tool 606, and a content sharing tool 608.

The device connection tool 602 establishes a connection between a first device and a second device, for example, the first device 502 and the second device 504. The connection between the first device and the second device may be by way of one or more of ultrasonic pairing, sharing key, Bluetooth pairing, ultra-wide band communication, Wi-Fi, ZigBee, operating system-specific casting protocols (e.g., Airplay® or Google Cast®), or another local network or protocol. The device connection tool 602 may establish the connection between the first device and the second device based on a selection at the first device of the second device from a list of available devices to which to connect. For example, a client application running at the first device (e.g., the client application 510 shown in FIG. 5) may prompt a user of the first device with a list of devices with which a connection may be established, and the user of the first device may select the second device from the list of devices. Alternatively, the device connection tool 602 may establish the connection between the first device and the second device based on a detection, by the device connection tool 602 or another software aspect at the first device, of the second device. For example, the device connection tool 602 may establish a connection between the first device and the second device over an ultrasonic pairing based on an ultrasonic signal transmitted from the second device being detected at the first device.

In some cases, the device connection tool 602 may establish the connection between the first device and the second device based on a prior connection between the first device and the second device or otherwise based on an authentication by the first device to connect to or otherwise access the second device. For example, the first device or a conferencing system data store accessible to the first device (e.g., via the device connection tool 602) may store information associated with past connections to other devices. In some such cases, the device connection tool 602 running at the first device can detect the second device, such as when the first device is moved within a threshold range of the second device (e.g., a detectable range, such as a range at which an ultrasonic, Bluetooth, or other signal from the second device can be detected at the first device), the device connection tool 602 may prompt the user of the first device to indicate whether or not to connect the first device to the second device. In some cases, configurations defined for use with the device connection tool 602 (e.g., by or for an account administrator) may control a length of a detectable range for connecting to a second device. In some cases, such configurations may also or instead control an amount of time that a prior connection between the first device and the second device may remain available for determining a new connection between those devices.

The virtual display instantiation tool 604 instantiates a virtual display at the first device based on the connection established between the first device and the second device. In particular, based on the established connection between the first device and the second device, the virtual display instantiation tool 604 uses a virtual display driver to cause an operating system of the first device to recognize the second device as an additional display. In some cases, the virtual display driver may be deployed from the virtual display instantiation tool 604 or otherwise from the virtual display software 600 or a client application which includes the virtual display software 600 based on instructions from the virtual display instantiation tool 604. In some cases, the virtual display driver may already be present within a storage of the first device and accessed or otherwise run based on instructions from the virtual display instantiation tool 604. After the operating system at the first device installs the virtual display driver, the first device is configured to use the virtual display associated with the virtual display driver. The virtual display instantiation tool 604 then binds a display of the second device to the virtual display to cause the display of the second device to be the device accessed by the virtual display.

The display selection tool 606 receives a selection of the virtual display from the user of the first device (e.g., via an interaction with a user interface element of the client application during the video conference). For example, at a time when the user of the first device seeks to initiate the screen share of content during the video conference from the first device via the second device using the virtual display, the user of the first device may select to initiate the screen share within the client application. The display selection tool 606 selects the virtual display based on such user initiation. Selecting the virtual device includes designating the virtual display as a source of content (e.g., media) to be shared with other participants during the video conference, for example, by the content thereof being mirrored within a user interface of the video conference.

The content sharing tool 608 facilitates a screen share of content during the video conference from the first device via the second device using the virtual display. In particular, the content sharing tool 608 facilitates the screen share of content by transmitting a video stream including the content output at the virtual display to the conferencing software to cause the conferencing software to transmit video streams including that content to other conference participant devices connected to the video conference. In at least some cases, the subject content of the screen share is shared via the second device using the virtual display while other content excluded from the screen share is output at a display of the first device.

Although the tools 602 through 608 are shown as functionality of the virtual display software 600 as a single piece of software, in some implementations, some or all of the tools 602 through 608 may exist outside of the virtual display software 600 and/or the software platform may exclude the virtual display software 600 while still including the some or all of tools 602 through 608 in some form elsewhere. For example, some or all of the tools 602 through 608 may be implemented by a client application, such as the client application 510 shown in FIG. 5.

Figure 7:
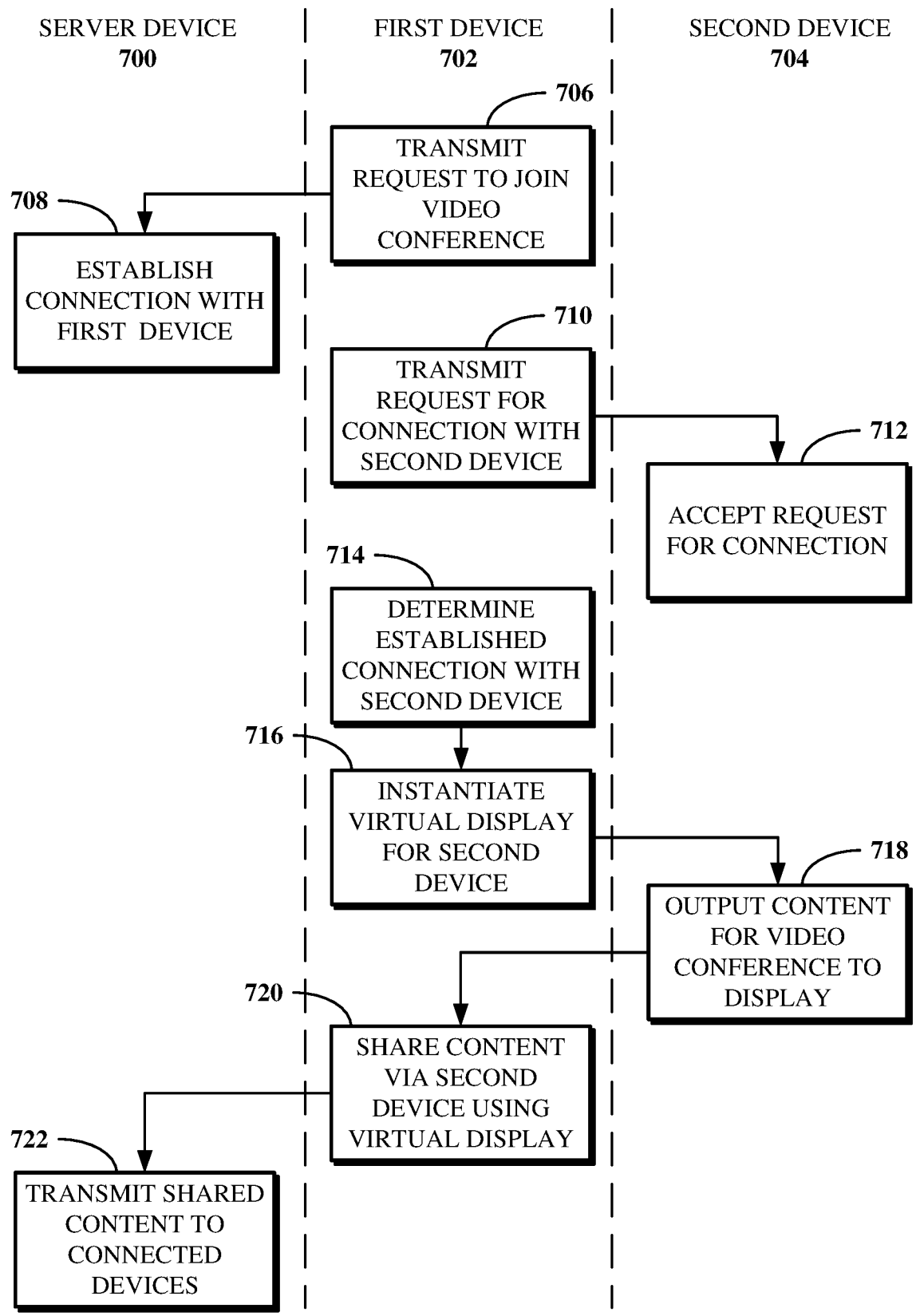
FIG. 7 is a swim lane diagram of an example sequence of operations performed between a server device, a first device, and a second device.

FIG. 7 is a swim lane diagram of an example sequence of operations performed between a server device 700, a first device 702, and a second device 704, which may, for example, respectively be the server device 508, the first device 502, and the second device 504 shown in FIG. 5. At 706, a request to join (e.g., connect to) the video conference is transmitted from the first device 702 to the server device 700. At 708, the server device 700 establishes a connection with the first device 702 based on the request. At 710, a request for a connection with the second device 704 is transmitted from the first device 702 to the second device 704. At 712, the second device 704 accepts the request for connection received from the first device 702. At 714, an established connection between the first device 702 and the second device 704 is determined at the first device 702. At 716, a virtual display for sharing content from the first device 702 using the second device 704 is instantiated. At 718, content to be shared during the video conference is output for display at the second device 704, based on the content being added to the virtual display at the first device 702. At 720, the content is shared from the first device 702 via the second device 704 using the virtual display. At 722, the shared content is transmitted by the server device 700 to other conference participant devices connected to the video conference. In some implementations, the operations at 710 and 712 for connecting the first device 702 and the second device 704 may be performed before the operations at 706 and 708 for connecting the first device 702 to the video conference at the server device 700.

Figure 8:
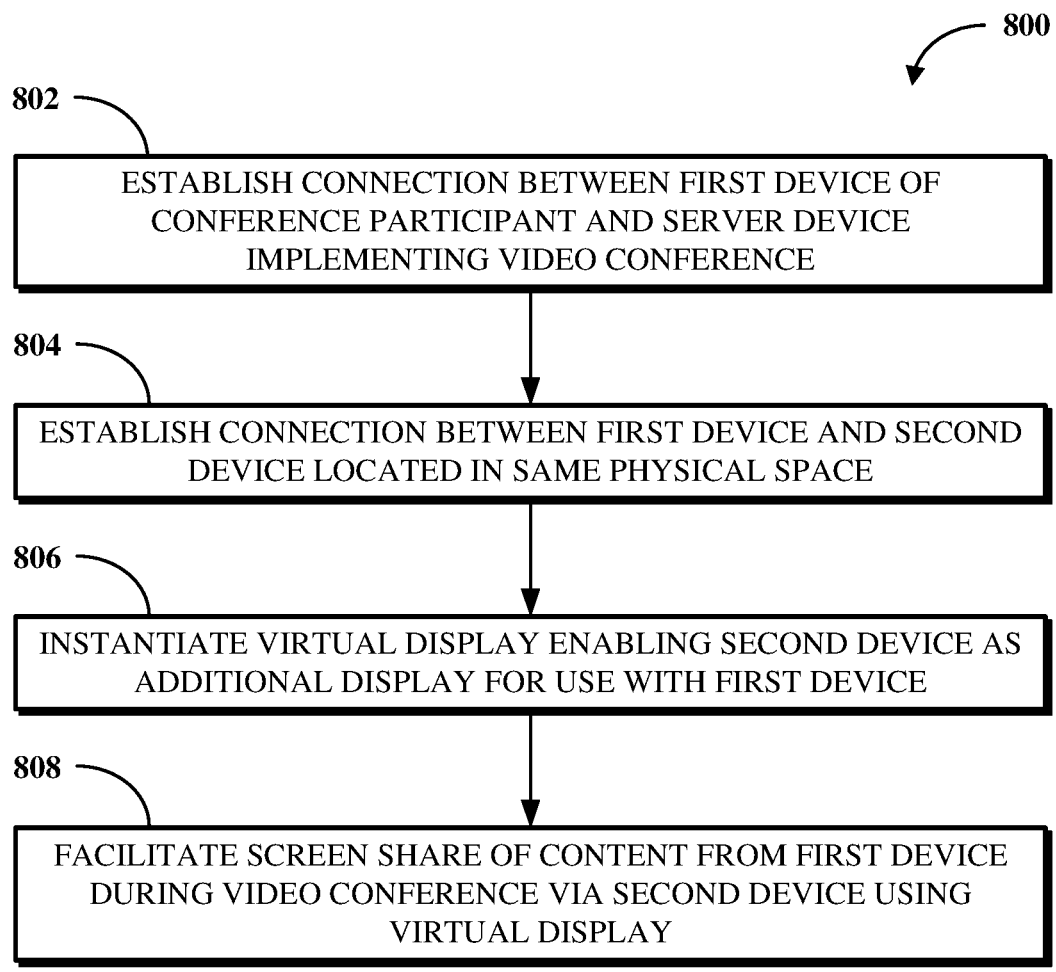
FIG. 8 is a flowchart of an example of a technique for facilitating a screen share of content using a virtual display instantiated based on a connection between a first device and a second device.

To further describe some implementations in greater detail, reference is next made to examples of techniques which may be performed by or using a system for facilitating a screen share of content using a virtual display instantiated based on a connection between a first device and a second device. FIG. 8 is a flowchart of an example of a technique 800 for facilitating a screen share of content using a virtual display instantiated based on a connection between a first device and a second device. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800, or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, a connection is established between a first device associated with a conference participant and a server device implementing a video conference. The first device may, for example, be a single-display personal computing device, such as a desktop computer, laptop computer, tablet computer, or smartphone. The video conference is implemented using conferencing software running at the server device. Two or more conference participants, including the conference participant using the first device, may participate in the video conference from one or more locations, such as a same physical space (e.g., conference room), a same geographic location (e.g., office premises), or different geographic locations (e.g., in which some conference participants are in a same physical space or geographic location and others are in one or more different geographic locations). The video conference supports exchanges of media between the conference participants, including the screen sharing of content from a display of a device of a conference participant (e.g., the first device) to a user interface of the video conference for output at the other devices connected to the video conference.

At 804, a connection is established between the first device and a second device. The second device includes a display. For example, the second device may be a large television or monitor in a conference room at an office. In another example, the second device may be a video-enabled smart speaker in a kitchen at a house. In yet another example, the second device may be a seatback device in a vehicle. The first device and the second device may, for example, be located in a same physical space. Alternatively, the first device may be within a threshold range (i.e., distance) of the second device. The connection between the first device and the second device may be established using one of ultrasonic pairing, a sharing key, Bluetooth, or a casting protocol, although other network connections and protocols (e.g., Wi-Fi) may also be used. For example, establishing the connection can include between the first device and the second device establishing the connection between the first device and the second device by an ultrasonic pairing of the first device and the second device. In another example, establishing the connection between the first device and the second device can include establishing the connection between the first device and the second device using a sharing key input within a client application running at the first device. In yet another example, establishing the connection between the first device and the second device can include establishing the connection between the first device and the second device using Bluetooth or a casting protocol. The connection is thus a device-to-device connection between the first device and the second device. In some implementations, however, the connection may be intermediated by the server device or another computing device. For example, where the first device and the second device each run client applications for connecting to the video conference, the connection between the first device and the second device may be established using those client applications and thus using software (e.g., the conferencing software or other software) at the server device.

In some implementations, the connection between the first device and the second device may be established using a prior connection record accessed based on a detection of the first device within a threshold range of the second device. For example, the prior connection record may be a record or other data stored at the first device, the second device, the server device, or another device indicating a past connection established between the first device and the second device. Establishing the connection between the first device and the second device using the prior connection record may thus include determining that the first device is within a threshold range of the second device, accessing a data store storing the prior connection record based on the first device being within the threshold range of the second device, and authenticating access to the second device by the first device using the prior connection record. In some implementations, the connection between the first device and the second device may be established before the connection between the first device and the server device is established. For example, the conference participant, as the user of the first device, may enter a location or threshold range of the second device and cause the establishing of the connection between the first device and the second prior to causing the first device to connect to the video conference.

At 806, a virtual display enabling use of a display of the second device as an additional display for the first device is instantiated. The virtual display is instantiated at the first device based on the connection established between the first device and the second device. Instantiating the virtual display can include using a virtual display driver to, based on the established connection, cause an operating system of the first device to recognize the virtual display as an additional display available to the first device, wherein the virtual display extends a display of the second device. For example, the virtual display driver used to instantiate the virtual display may be included within a client application used to connect the first device to the video conference. Instantiating the virtual device can thus include causing an operating system of the first device to install a virtual display driver included in the client application. For example, instantiating the virtual device can include deploying a virtual display driver configured to cause the first device to recognize the virtual display as an additional display.

Instantiating the virtual display can include binding a display of the second device to the virtual display to cause the display of the second device to be accessible via the virtual display. For example, once the virtual display driver is installed and the virtual display is recognized as an additional display available to the first device, the display of the second device to which the first device is connected may then be bound to the virtual display. Binding the display of the second device to the virtual display includes configuring the display of the second device to mirror content output at the virtual display. Given that the virtual display creates an additional display for the first device and the binding mirrors the virtual display to the display of the second device, the binding of the display of the second device to the virtual display causes the display of the second device to be accessible for use by the first device via the virtual display and thus configures the first device to be usable to move content from a display of the first device to the display of the second device via the virtual display.

In some implementations, instantiating the virtual display can include verifying that the first device is within a threshold range of the second device. For example, for security purposes, a configuration may be enabled that prevents the instantiation of the virtual display based on the connection established between the first device and the second device where the first device is moved outside of a threshold range of the second device after the connection is established. Verifying that the first device is within the threshold range can include determining that a signal transmitted (e.g., on request, on continual broadcast, or the like) from the second device is accessible at the first device. In some implementations, upon instantiating the virtual display, or as part of the process for instantiating the virtual display, use of the second device with the virtual display can be authenticated based on the connection established between the first device and the second device, and the second device may accordingly be registered for later use with the first device. For example, registering the second device for later use with the first device may include generating or updating a prior connection record indicative of the connection established between the first device and the second device. The prior connection record may be used in future video conference settings to establish the connection between the first device and the second device, as described above.

At 808, a screen share of content from the first device during the video conference is facilitated via the second device using the virtual display. In particular, a screen share of first content during the video conference from the first device is facilitated via the second device using the virtual display while second content excluded from the screen share is output at a display of the first device. The exclusion of the second content from the screen share refers to the second content remaining at the display of the first device rather than having been moved to the virtual display for outputting during the screen share. Facilitating the screen share of content from the first device during the video conference via the second device using the virtual display can include enabling the conference participant to move the first content from a display of the first device to a display of the second device before or after initiating the screen share. For example, because the virtual display is treated as an additional (e.g., extended) monitor of the first device, the conference participant may move content to the virtual display as if the virtual display were an actual, physical display of the first device. The conference participant using the first device may select to initiate a screen share process during the video conference, such as before or after moving content to the virtual display, to cause the conferencing software at the server device to receive a video stream of the content output at the virtual display and accordingly transmit video streams of such content output at the virtual display to the devices connected to the video conference. Because the virtual display is mirrored to the second device, the content output at the virtual display may also be output at the display of the second device.

In some implementations, where the second device runs a client application connecting the second device to the video conference, facilitating the screen share of content from the first device during the video conference via the second device using the virtual display can include using the client application running at the second device to transmit a video stream of content output at the virtual display to the conferencing software at the server device. For example, the video stream may be transmitted using a connection established between the second device and the server device, such as based on a user of the second device (e.g., the conference participant associated with the first device or another person) causing the second device to join the video conference.

In some implementations, the technique 800 may include terminating the connection between the first device and the second device based on a connection established between the second device and a third device associated with a second conference participant of the video conference. For example, during the video conference, such as while the conference participant associated with the first device is sharing content from the first device via the second device using the virtual display, the second conference participant may wish to initiate a screen share of content from the third device via the second device (e.g., using a second virtual display instantiated at the third device). The screen share from the third device may in some cases cause the screen share from the first device to cease, and may further cause the first device to disconnect from the second device to enable the third device to connect to the second device. In some implementations, the technique 800 may include establishing a connection between such a third device and the second device and facilitating a screen share of third content during the video conference from the third device via the second device while the first content from the first device remains screen shared via the second device. For example, the content from each of the first device and the third device may be simultaneously streamed via the second device.

The implementations of this disclosure correspond to methods, non-transitory computer readable media, apparatuses, systems, devices, and the like. In some implementations, a method comprises instantiating, at a first device associated with a conference participant of a video conference, a virtual display based on a connection established between the first device and a second device; and facilitating a screen share of first content during the video conference from the first device via the second device using the virtual display while second content excluded from the screen share is output at a display of the first device. In some implementations, a non-transitory computer readable medium stores instructions operable to cause one or more processors to perform operations comprising instantiating, at a first device associated with a conference participant of a video conference, a virtual display based on a connection established between the first device and a second device; and facilitating a screen share of first content during the video conference from the first device via the second device using the virtual display while second content excluded from the screen share is output at a display of the first device. In some implementations, an apparatus comprises a memory and a processor configured to execute instructions stored in the memory to instantiate, at a first device associated with a conference participant of a video conference, a virtual display based on a connection established between the first device and a second device; and facilitate a screen share of first content during the video conference from the first device via the second device using the virtual display while second content excluded from the screen share is output at a display of the first device.

In some implementations of the method, non-transitory computer readable medium, or apparatus, instantiating the virtual display comprises binding a display of the second device to the virtual display.

In some implementations of the method, non-transitory computer readable medium, or apparatus, instantiating the virtual display comprises based on the established connection, using a virtual display driver to cause an operating system of the first device to recognize the virtual display as an additional display available to the first device, wherein the virtual display extends a display of the second device.

In some implementations of the method, non-transitory computer readable medium, or apparatus, instantiating the virtual display comprises verifying that the first device is within a threshold range of the second device.

In some implementations of the method, non-transitory computer readable medium, or apparatus, In some implementations of the method, non-transitory computer readable medium, or apparatus, the method comprises, the operations comprise, and the processor is configured to execute the instructions for establishing the connection between the first device and the second device by an ultrasonic pairing of the first device and the second device.

In some implementations of the method, non-transitory computer readable medium, or apparatus, the method comprises, the operations comprise, and the processor is configured to execute the instructions for establishing the connection between the first device and the second device using a sharing key input within a client application running at the first device.

In some implementations of the method, non-transitory computer readable medium, or apparatus, the method comprises, the operations comprise, and the processor is configured to execute the instructions for authenticating use of the second device with the virtual display based on the connection established between the first device and the second device; and registering the second device for later use with the first device.

In some implementations of the method, non-transitory computer readable medium, or apparatus, the method comprises, the operations comprise, and the processor is configured to execute the instructions for terminating the connection between the first device and the second device based on a connection established between the second device and a third device associated with a second conference participant of the video conference.

In some implementations of the method, non-transitory computer readable medium, or apparatus, a virtual display driver used to instantiate the virtual display is included within a client application used to connect the first device to the video conference.

In some implementations of the method, non-transitory computer readable medium, or apparatus, the first device is a single-display personal computing device and the second device is a shared computing device located within a conference room.

In some implementations of the method, non-transitory computer readable medium, or apparatus, instantiating the virtual display comprises deploying a virtual display driver configured to cause the first device to recognize the virtual display as an additional display; and binding a display of the second device to the virtual display to cause the display of the second device to be accessible via the virtual display.

In some implementations of the method, non-transitory computer readable medium, or apparatus, the method comprises, the operations comprise, and the processor is configured to execute the instructions for establishing the connection between the first device and the second device using one of ultrasonic pairing, a sharing key, Bluetooth, or a casting protocol.

In some implementations of the method, non-transitory computer readable medium, or apparatus, the first device is a single-display personal computing device and the second device is a device located within a vehicle.

In some implementations of the method, non-transitory computer readable medium, or apparatus, a display of the second device is bound to the virtual display.

In some implementations of the method, non-transitory computer readable medium, or apparatus, the first device connects to the video conference using a client application, and instantiating the virtual display comprises causing an operating system of the first device to install a virtual display driver included in the client application.

In some implementations of the method, non-transitory computer readable medium, or apparatus, the first device connects to the video conference using a client application, and facilitating the screen share comprises enabling the conference participant to move the first content from a display of the first device to a display of the second device before or after initiating the screen share.

In some implementations of the method, non-transitory computer readable medium, or apparatus, the connection between the first device and the second device is established using a prior connection record accessed based on a detection of the first device within a threshold range of the second device.

In some implementations of the method, non-transitory computer readable medium, or apparatus, the connection between the first device and the second device is established using one of ultrasonic pairing, a sharing key, Bluetooth, or a casting protocol.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   instantiating, using a virtual display driver included within a client application used to connect a first device to a video conference, a virtual display based on a connection established between the first device and a second device; and
   facilitating a screen share of first content during the video conference from the first device via the second device using the virtual display while second content excluded from the screen share is output at a display of the first device.

2. The method of claim 1, wherein instantiating the virtual display comprises:
   binding a display of the second device to the virtual display.

3. The method of claim 1, wherein instantiating the virtual display comprises:
   based on the established connection, using the virtual display driver to cause an operating system of the first device to recognize the virtual display as an additional display available to the first device, wherein the virtual display extends a display of the second device.

4. The method of claim 1, wherein instantiating the virtual display comprises:
   verifying that the first device is within a threshold range of the second device.

5. The method of claim 1, comprising:
   establishing the connection between the first device and the second device by an ultrasonic pairing of the first device and the second device.

6. The method of claim 1, comprising:
   establishing the connection between the first device and the second device using a sharing key input within a client application running at the first device.

7. The method of claim 1, comprising:
authenticating use of the second device with the virtual display based on the connection established between the first device and the second device; and
registering the second device for later use with the first device.

8. The method of claim 1, comprising:
terminating the connection between the first device and the second device based on a connection established between the second device and a third device.

9. The method of claim 1, wherein the first device is a single-display personal computing device and the second device is a shared computing device located within a conference room.

10. A non-transitory computer readable medium storing instructions operable to cause one or more processors to perform operations comprising:
instantiating, using a virtual display driver included within a client application used to connect a first device connected to a video conference, a virtual display based on a connection established between the first device and a second device; and
facilitating a screen share of first content during the video conference from the first device via the second device using the virtual display while second content excluded from the screen share is output at a display of the first device.

11. The non-transitory computer readable medium of claim 10, wherein the operations for instantiating the virtual display comprise:
causing, using the virtual display driver, the first device to recognize the virtual display as an additional display; and
binding a display of the second device to the virtual display to cause the display of the second device to be accessible via the virtual display.

12. The non-transitory computer readable medium of claim 10, the operations comprising:
establishing the connection between the first device and the second device using one of ultrasonic pairing, a sharing key, Bluetooth, or a casting protocol.

13. The non-transitory computer readable medium of claim 10, wherein the first device is a single-display personal computing device and the second device is a device located within a vehicle.

14. An apparatus, comprising:
a memory; and
a processor configured to execute instructions stored in the memory to:
instantiate, using a virtual display driver included within a client application used to connect a first device to a video conference, a virtual display based on a connection established between the first device and a second device; and
facilitate a screen share of first content during the video conference from the first device via the second device using the virtual display while second content excluded from the screen share is output at a display of the first device.

15. The apparatus of claim 14, wherein a display of the second device is bound to the virtual display.

16. The apparatus of claim 14, wherein the first device connects to the video conference using a client application, and wherein, to instantiate the virtual display, the processor is configured to execute the instructions to:
cause an operating system of the first device to install the virtual display driver.

17. The apparatus of claim 14, wherein the first device connects to the video conference using a client application, and wherein, to facilitate the screen share of the first content during the video conference, the processor is configured to execute the instructions to:
enable a movement of the first content from a display of the first device to a display of the second device before or after initiating the screen share.

18. The apparatus of claim 14, wherein the connection between the first device and the second device is established using a prior connection record accessed based on a detection of the first device within a threshold range of the second device.

19. The apparatus of claim 14, wherein the connection between the first device and the second device is established using one of ultrasonic pairing, a sharing key, Bluetooth, or a casting protocol.

20. The apparatus of claim 14, wherein the connection between the first device and the second device is terminated based on a connection between the second device and a third device.

* * * * *